Figure 1:
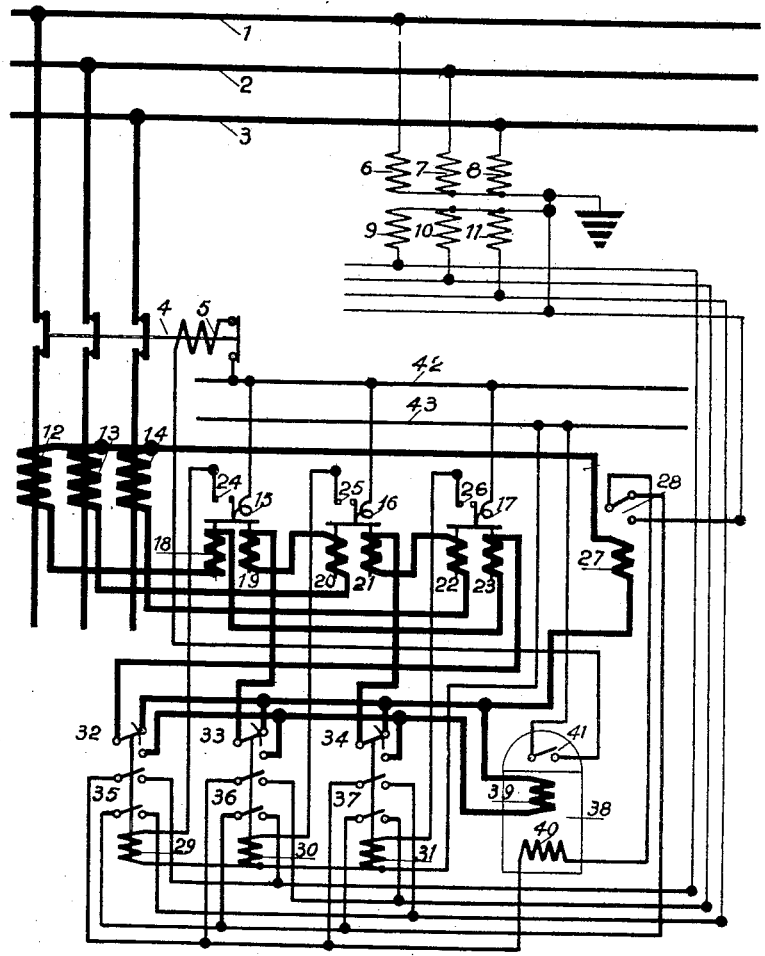

Fig:1

March 11, 1941.  R. DUBUSC  2,234,235

PROTECTION DEVICE FOR ELECTRICAL NETWORKS

Filed Oct. 21, 1937  3 Sheets-Sheet 2

INVENTOR:
ROGER DUBUSC
BY Haseltine, Lake & Co.
ATTORNEYS

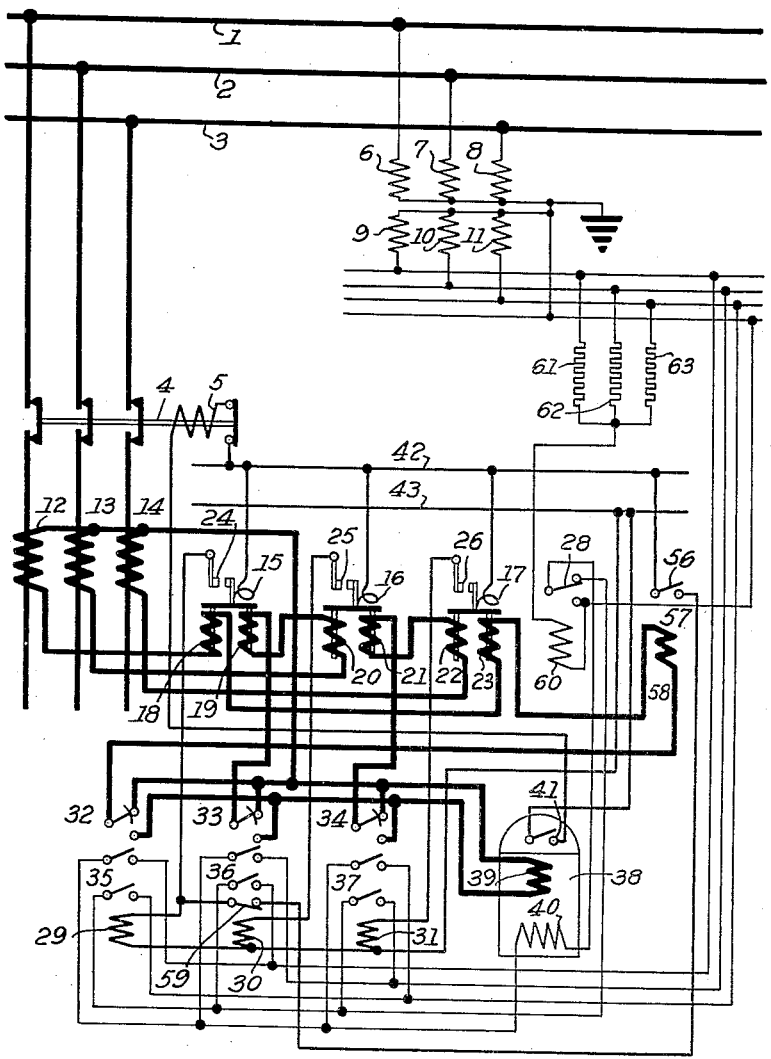

Patented Mar. 11, 1941

2,234,235

UNITED STATES PATENT OFFICE 2,234,235

PROTECTION DEVICE FOR ELECTRICAL NETWORKS

Roger Dubusc, Paris, France

Application October 21, 1937, Serial No. 170,244
In France October 21, 1936

7 Claims. (Cl. 175—294)

This invention relates to protection devices for electrical networks and the like.

Devices for protecting alternating current networks and machines against short circuits and insulation faults utilise relays or groups of relays which are sensitive to one or more electrical values, such as current, voltage, power, impedance, reactance and the like, which are capable of characterising a fault.

When a polyphase circuit is concerned, as generally is the case, devices are known which utilise as many groups of relays as there are phases, so that there is always at least one group of relays which operates correctly (that is to say which is influenced by the currents and voltages characterising the fault) whatever may be the nature or the position of the fault.

Devices are likewise known which utilise a single protection relay system with which convenient connections are automatically established according to the nature of the fault which occurs. These devices comprise, generally, an assembly of elements, referred to hereafter as a "phase selector," which react as a function of the various conditions of the fault, select convenient currents and voltages and provide the connections necessary for operating the protection relay or group of protection relays by means of these currents and voltages.

To this end phase selectors have already been proposed which permit of effecting in a more or less similar manner the measurement of the characteristic values of the fault by means of a single relay or group of relays. This arrangement generally utilises maximum current relays inserted in the different phases of the circuit and operation occurs only in the relay or relays inserted in the phase or phases affected by the fault. Such arrangements present the disadvantage of making the whole of the protection device dependent on the maximum relay, which renders the protection device inoperative in the case of a fault producing a current lower than the normal current of the protected circuit. It is known that in certain circumstances the fault currents may be lower than this normal current.

The present invention has for an object to remedy this serious disadvantage.

The essential feature of the present invention is that the phase selector acts on the protection relay, not as a function of the absolute value of the voltages or currents of the different phases, but differentially as a function of their unbalancing relatively to one another the current in the phase or phases affected by the fault being always higher than the current in the other phases and the voltages of the affected phases being always lower than those of the other phases.

Another feature of the invention is that the comparison with one another of the currents or voltages of the various phases is effected two by two, by circular permutation, by auxiliary relays or elements of comparison, in such a way that only one element of comparison is brought into play whatever may be the nature of the fault.

Another feature of the invention consists in providing means adapted to act when a fault occurs which is balanced in all the phases. These means may consist either of a supplementary element inserted in one phase and responsive to variations of an electrical value of this phase, so as to act in lieu of the difference phase selectors in case of a fault balanced in the three phases, or in the permanent connection of the protection relay with one of the phases corresponding to the operation taking place when a fault occurs between a predetermined pair of phases which arrangement makes it possible to omit the corresponding pair of elements of comparison (preferential fault connection).

The distinctive nature of the phase selector provided by the present invention (lying in the fact that only one of the comparison elements, or the like, is to work in any case) will be complied with, when a supplementary element is provided, by placing said supplementary element out of service when any one of the comparison elements operates, unless the arrangement of this supplementary element is such that it never functions when one of the two other comparison elements operates.

Figure 2:
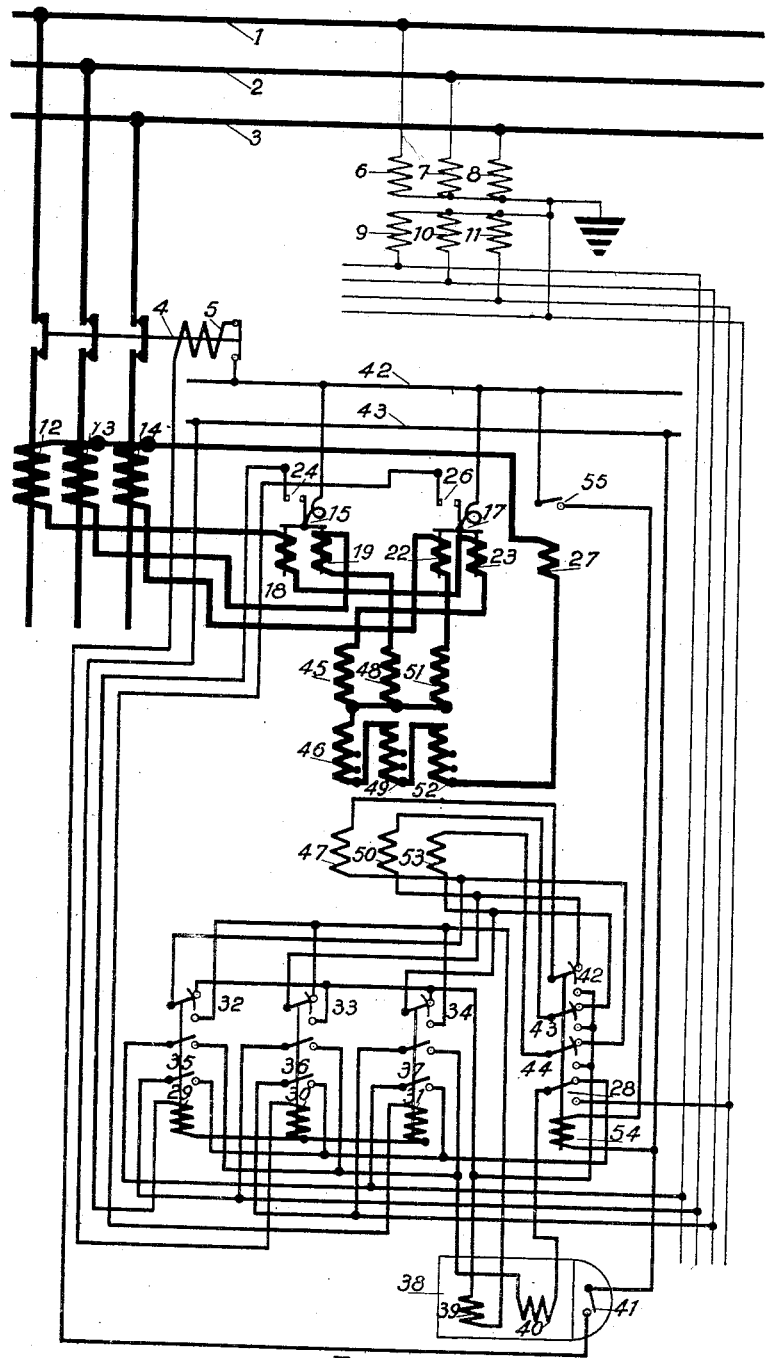

In the accompanying drawings, Fig. 1 is a circuit diagram of one form of the invention, Fig. 2 is a circuit diagram of another form or modification, while Fig. 3 is an analogous circuit diagram to that in Fig. 1, including a modification.

If $U_1 U_2 U_3$ are the three voltages between phases and earth (star voltages) of a three-phase circuit, $U_{(1.2)} U_{(2.3)} U_{(3.1)}$ the three inter-phase voltages (delta voltages), $I_1, I_2, I_3, I_T$ the currents in the three phases and in the earth conductor, it is known that the currents and the voltages to be selected according to the nature of the fault are, in case of:

(a) A fault between one phase and ground; the current in this phase and the voltage between this phase and earth, for example $I_1$ and $U_1$, if phase 1 is grounded;

(b) A fault between two phases; the current in one of the two phases and the voltage between these two phases, namely $I_1$ or $I_2$, and $U_{(1.2)}$, if the phases 1 and 2 are short circuited;

(c) Double earthing of two different phases at two different points of a network; the current in one of these two phases and the voltage between this phase and earth, namely $I_1$ and $U_1$, or $I_2$ and $U_2$, if the phases 1 and 2 are grounded;

(d) A three-phase fault; one of the phase currents and the voltage between this phase and one of the two others, for example $I_1$ and $U_{(1.2)}$.

It is known likewise that when the protection device comprises a relay acting as a measuring element, for example in order to measure the reactance or impedance of a defective circuit, these values of current and voltage, that shall be called hereinafter "approximate values," are not sufficient to secure precise measurement. For this purpose, it is known that the currents and voltages to be selected are, in case of:

(I) A fault between one phase, 1 for example, and ground; $I_1-kI_r$ and $U_1$, $k$ being a coefficient characterising the ratio between the phase impedances and the ground impedances, (II) A fault between two phases, for example 1 and 2; $I_1-I_2$ and $U_{(1.2)}$ (III) Double ground connection, for example of the phases 1 and 2; $I_1-kI_r$ and $U_1$ or $I_2-kI_r$ and $U_2$ (IV) A three-phase fault; $I_1-I_2$ and $U_{(1.2)}$ or $I_2-I_3$ and $U_{(2.3)}$ or $I_3-I_1$ and $U_{(3.1)}$.

These values shall be called hereinafter "exact values."

The phase selector devices according to the present invention have for an object to provide suitable voltages and currents for the protection relays, in the different cases of faults above enumerated, and are applicable as well in the case of exact values as in that of approximate values.

Two embodiments of the present invention will now be described with reference, respectively, to Figs. 1 and 2 of the accompanying drawings.

In Fig. 1, 1, 2, 3 designate the bus bars of a station comprising an outgoing line, controlled by the circuit breaker 4 provided with a trip coil 5. 6, 7, 8 designate the primary windings of three voltage transformers connected between phases and ground. 9, 10, 11 denote the secondary windings of these transformers. 12, 13, 14 designate three current transformers inserted in the outgoing line; 15, 16, 17 designate three relays for the comparison of the phase currents, these relays constituting the main part of the phase selector and including each a so-called "motor" winding called respectively 18, 20, 22 and a so-called "opposing" winding called 19, 21, 25.

The contacts operated by these relays are called 24, 25 and 26. A relay such as 15 closes its contact 24 when the current in its motor winding 18 is greater than a predetermined multiple of the current in its opposing winding 19. The motor winding 18 of the relay 15 is energized from the current $I_1$ and its opposing winding 19 is energized from the current $I_2$. This relay, therefore, closes its contact when $I_1>k'I_2$, in which $k'$ is a constant given by construction.

27 designates the winding of a current relay connected in series with the neutral connection of the current transformers. This relay operates an opening and closing contact 28. 29, 30, 31 designate the windings of three intermediate relays controlled respectively by relays 15, 16 and 17.

These three intermediate relays operate respectively on the one hand three opening and closing contacts 32, 33, 34 and on the other hand three bi-polar closing contacts 35, 36, 37.

38 designates a relay of any type comprising as diagrammatically shown, a current winding 39, a voltage winding 40 and a contact 41 controlling the circuit breaker 4. This relay 38 is the main protection relay which ensures the protection properly so-called of the outgoing line 1, 2, 3.

42 and 43 designate the two bars of an auxiliary source of current serving for the supply of the intermediate relays and of the coil 5 of the circuit breaker 4.

The arrangement illustrated in Fig. 1 operates as follows:

Supposing for instance that there is a fault present between 1 and 2, say a short-circuit, the current in phases 1 and 2 and therefore in windings 12 and 13 undergoes a sudden and considerable rise. Now, it should be noted that the two windings of relay 15, to wit 18 and 19, which act respectively in opposite ways on the armature of said relay, are in series one with 12 and the other with 13. Therefore both of the windings of 15 undergo the same rise of current and the differential action of the all is not changed. But, in relay 16, the motor winding 20 is connected with phase winding 13, through which a sudden rise of current has occurred, whereas the resisting winding 21 is connected to phase winding 14 where no change has taken place. Therefore relay 16 is brought into operation. As for relay 17 it is not operated since the current through its motor winding 22 (connected with 14) has not changed, whereas the current through the resisting winding 23 (connected with 12) has increased.

Now the operation of relay 16 closes contact 25. This closes the following circuit: terminal 42, contact 25, winding 30, terminal 43. The energizing of winding 30 causes its armature to move downwardly, which causes the movable arm of a switch 33 to pass from the upper contact to the lower contact and closes the double pole switch 36.

As a consequence of this, two circuits are closed:

The first of these circuits is the following: Winding 13, windings 20 and 19, switch 33, winding 39 of protection relay 38, switch 32, windings 58, 23 and 18, winding 12. Therefore the current $I_2$ flows through the winding 39 of the main relay 38.

The second of these circuits is the following: Winding 9, lower branch of switch 36, contact 28, winding 40 of the main relay 38, upper branch of switch 36, winding 10. Therefore the voltage $U_{(1.2)}$ is impressed upon the second winding, 40, of relay 38.

Under the actions of both of these windings 39 and 40, the contact 41 of relay 38 is closed, and the following circuit is closed: 42, winding 5 of switch 4, 41, 43. Relay 4 is energized and opens the circuits of the three phases.

In case of a fault between one of the phases, say, 2, and the earth, the working is partly similar in that relay 16 operates for the same reasons and causes winding 20 to attract its armature. But in this case a current flows to the neutral bar of 12, 13, 14. In other words, the current that has flown through 39 returns through winding 27 to this neutral bar, and the energizing of winding 27 causes the arm of switch 28 to pass from the upper to the lower position. As a consequence, the current that has flown through winding 40, instead of returning to one of the phases is returned through said switch 28 to the earth. Therefore, while current $I_2$ flows through winding 39, winding 40 is connected to the voltage $U_2$.

This arrangement supplies, therefore, to the protection relay the exact values of voltages and the approximate values of currents. It will be described later how it may be transformed to adapt it to exact values of the currents.

In case of a three-phase fault none of the relays 15, 16, 17 operate.

According to a first embodiment of the invention, illustrated by Fig. 1, I insert in shunt with the contact of one of the comparison relays, for instance in shunt with the contact 24 of relay 15, the contact 56 of a maximum current relay 57 as shown in Fig. 3. The winding 58 of this last mentioned relay is fed with the current of one of the phases, phase 1 in the example shown, by inserting this winding 58 in series with windings 12, 18 and 23. This maximum current relay could be replaced by a minimum voltage relay or a minimum impedance relay.

With this arrangement, if an unbalanced fault occurred, for instance between phases 1 and 2 and if the current through phase 1 were sufficiently high for causing relay 57 to work, the closing of contact 56 might energize winding 29, which would disturb the operation of the whole system.

In order to avoid this, I insert, in series with contact 56, a contact the opening of which is produced by the energizing of winding 30, said contact being shown at 59. Therefore, when relay 16 operates, the closing of the double contact 36 is preceded by the opening of contact 59 and the circuit in which contact 56 is inserted is broken at 59 so that the closing of 56 can have no effect.

On the other hand, upon occurrence of a three-phase fault, none of the relays 15, 16, 17 operates since these relays are influenced by differences between currents and these differences remain the same. But the current flowing through 58 increases and causes contact 56 to close. The following circuit is established: 42, contact 56, contact 59, winding 29, wire 43. The energizing of relay 29, causes, in the manner above described, current $I_1$ and voltage $U_{(1.3)}$ to act upon windings 39 and 40 respectively.

According to a second method of working the invention the non-operation of the phase selector in case of a three-phase fault is remedied by previously preparing the connections for automatic operation upon a fault occurring between two predetermined phases. Fig. 2 illustrates by way of example one of the possible arrangements for this purpose. In these drawings the same reference numerals designate the same elements as in Fig. 1. However, the intermediate relay 30 is so arranged that the position of rest of the contacts that it controls is the working position of the preceding example illustrated by Fig. 1. The relay 16 of Fig. 1 is omitted in the arrangement according to Fig. 2.

When one of the relays 29 or 31 is brought into play relay 30 is adapted to bring its contacts into the position corresponding to Fig. 1. For this purpose the winding of relay 30 is inserted between the common point of the windings of the relays 29 and 31 and the pole 43 of the auxiliary source, so that when one of the relays 29 or 31 is energized, relay 30 is also energized.

In order to supply relay 38 with exact values of the currents, three auxiliary current transformers are used each one having a first primary 45, 48 or 51 through which flows respectively the current of phase 1, 2 and 3 and a second primary 46, 49 or 52 through which flows the neutral current. The secondaries of these transformers 47, 50, 53 are connected in star or in delta arrangement by three reversing switches 42, 43, 44 operated by a relay 54 which is controlled by the contact 55 of relay 27 when the latter is energized by the neutral current. The contact 28 of relay 54 in the above arrangement plays the same part as the contact 28 of relay 27 in the arrangement of Fig. 1.

The windings 46, 49 and 52 of the auxiliary transformers may be provided with regulating tapping points in order to vary the ratio between the ampere-turns produced by the phase currents and the ampere-turns produced by the neutral current.

The arrangement above described operates as follows:

When there is a fault present between 1 and 2, the current in these phases and therefore in windings 12 and 13 undergoes a sudden rise. As the windings of relay 15, to wit 18 and 19, which are in series with 12 and 13, respectively, are mounted in opposition in this relay, their differential action is not changed by this rise of current.

On the other hand, the current flowing through the motor winding 22 of relay 17 undergoes no change since the current flowing through winding 14 has not changed. It is true that the current flowing through winding 23, connected with winding 12, has increased, but as winding 23 is a resisting winding, relay 17 is not operated.

Therefore, neither relay 15 nor relay 17 are operated in this case.

Consequently, in view of the connections above set forth, the winding 39 of relay 38 receives a current $I_1-I_2$, while the winding 40 of this relay is acted upon by the voltage $U_{(1.2)}$.

When there is a fault present between phase 2 and the earth, relay 27 is energized and through contact 55 it produces the energizing of relay 54. In view of the connections disclosed by Fig. 2, the current acting on the winding 39 of relay 38 is $I_2-kI_T$, while the voltage acting on the winding 40 of the same relay is $U_1$.

When a fault occurs between phases 2 and 3, for reasons above set forth relay 15 is not energized but relay 17 is energized and, as above explained, it operates relays 30 and 31, whereby the winding 39 of relay 38 is subjected to the action of current $I_2-I_3$, while the winding 40 of the same relay is subjected to voltage $U_{(2.3)}$.

When there is a fault present between phase 3 and the earth, relay 17 is energized, producing the operation of relays 30 and 31. Furthermore, in view of the current flowing to the neutral point of 12, 13, and 14, relay 27 is energized and, closing contact 55 it produces the energizing of relay 54. Consequently winding 39 is energized by current $I_3-kI_T$, while winding 40 is subjected to the action of voltage $U_3$.

In case of a fault occurring between phases 3 and 1, relay 15 is energized, while relay 17 remains uninfluenced. Consequently, relays 29 and 30 are energized. Winding 39 is subjected to the action of current $I_3-I_1$, and winding 40 is subjected to the action of voltage $U_{(3.1)}$.

When the fault is present between phase 1 and the earth, relays 15 and 27 are energized, while relay 17 remains uninfluenced. Relay 15 produces the operation of relays 29 and 30, whereby current $I_1-kI_T$ acts on the winding 30 of relay 38. On the other hand, relay 27 closes contact 55, and thus produces the energizing of relay 54, whereby the winding 40 of relay 38 is subjected to the action of voltage $U_{(3.1)}$.

When there is a fault between phase 1 and the earth, the correct working is thus ensured.

The currents and voltages supplied to relay 38 therefore will correspond in all cases to the exact values indicated above.

According to a modification of the method of operation of the present invention discrimination of faults between phases and ground faults is obtained by using instead of the earth current relay 27, an earth voltage relay supplied by the vectorial sum of the voltages between phases and ground.

Fig. 3 shows an analogous arrangement to that of Fig. 1, with the difference that the current relay 27 is replaced by a potential relay 60, fed according to one of the known arrangements which permit of obtaining the vectorial sum of the voltages between phases and earth. For instance, as shown by Fig. 3, I insert winding 60 between the neutral wire of the tension transformers and an artificial neutral point obtained by means of three equal resistances 61, 62, 63. The other reference numerals of Fig. 3 designate the same elements as in Figs. 1 and 2.

Having now particularly described and ascertained the nature of our said invention and in what manner the same is to be performed we declare that what we claim is:—

1. A protection system for a network of polyphase circuits, which comprises, in combination, electric elements connected to said circuits respectively responsive to current variations therein electric elements connected to said circuits respectively responsive to voltage variations therein, protecting means for opening said circuits, a single relay adapted to operate said protecting means, including two windings, a plurality of selector means for connecting one of said windings to at least one, but not all, of said first mentioned electric elements, and the other of said windings to at least one, but not all, of said second mentioned electric elements, and a plurality of auxiliary relays for controlling said selector means, respectively, each of these relays including two operating electric elements connected with two of the first mentioned electric elements, in differential manner, respectively.

2. A protection system for a network of polyphase currents, which comprises, in combination, current transformers connected to said circuits, respectively, voltage transformers connected to said circuits, respectively, protecting means for opening said circuits, a single relay adapted to operate said protecting means, including two windings, a plurality of selector means each adapted to connect one of said windings to one of said current transformers, respectively and the other of said windings to one of said voltage transformers, respectively, and a plurality of auxiliary relays, for controlling said selector means, respectively, each of said auxiliary relays including two windings mounted in opposition and connected in series with two different current transformers, respectively.

3. A system according to claim 2 further including a relay coupled with one of said circuits and operative by a fault in the corresponding phase, mounted in combination with the auxiliary relay corresponding to said circuit for acting together therewith on the corresponding selector means.

4. A system according to claim 2 in which one of said selector means is directly connected electrically with one phase circuit of the network.

5. A system according to claim 2 further including a relay interposed between said network and the earth and adapted, when energized, to modify the connection between said voltage transformers and said second mentioned winding.

6. A system according to claim 2 further including a relay interposed between said network and the earth and adapted, when energized, to connect one of said voltage transformers directly with said second mentioned winding.

7. A system according to claim 2 further including a plurality of auxiliary transformers having each two primaries, one inserted between two current phase circuits and the other inserted between one of said current phase circuits and the earth, said transformers being interposed between said auxiliary circuits and said selector means.

ROGER DUBUSC.